US009059789B2

(12) United States Patent
Chen et al.

(10) Patent No.: US 9,059,789 B2
(45) Date of Patent: Jun. 16, 2015

(54) SIGNAL PROCESSING METHOD, CONNECTOR, AND MEMORY STORAGE DEVICE

(71) Applicant: PHISON ELECTRONICS CORP., Miaoli (TW)

(72) Inventors: An-Chung Chen, Hsinchu (TW); Chih-Ming Chen, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 13/863,386

(22) Filed: Apr. 16, 2013

(65) Prior Publication Data
US 2014/0219319 A1 Aug. 7, 2014

(30) Foreign Application Priority Data
Feb. 7, 2013 (TW) .............................. 102104953 A

(51) Int. Cl.
H04B 1/00 (2006.01)
H04B 1/715 (2011.01)
(52) U.S. Cl.
CPC ..................................... H04B 1/715 (2013.01)
(58) Field of Classification Search
None
See application file for complete search history.

(56) References Cited

U.S. PATENT DOCUMENTS

| 7,421,011 | B2 * | 9/2008 | Pietila et al. | 375/147 |
| 8,201,010 | B2 | 6/2012 | Rose | |
| 2006/0262835 | A1 * | 11/2006 | Schmid et al. | 375/148 |

FOREIGN PATENT DOCUMENTS

TW 200811875 3/2008
TW 201239621 10/2012

OTHER PUBLICATIONS

"Office Action of Taiwan Counterpart Application," issued on Apr. 14, 2015, p. 1-5.

* cited by examiner

Primary Examiner — Adolf Dsouza
(74) Attorney, Agent, or Firm — Jianq Chyun IP Office

(57) ABSTRACT

A signal processing method, a connector and a memory storage device are provided. The signal processing method is for the connector which does not include a crystal oscillator. The signal processing method includes: receiving a first signal stream from a host system; tracking a transmission frequency of the first signal stream, and obtaining a frequency shift quantity of the first signal stream relative to the transmission frequency; determining if a spread spectrum operation is performed on the first signal stream according to the frequency shift quantity to generate a determination result; generating a second signal stream according to the determination result and the transmission frequency. Accordingly, the spread spectrum operation is handled under the situation without a crystal oscillator.

18 Claims, 7 Drawing Sheets

SIGNAL PROCESSING METHOD, CONNECTOR, AND MEMORY STORAGE DEVICE

CROSS-REFERENCE TO RELATED APPLICATION

This application claims the priority benefit of Taiwan application serial no. 102104953, filed on Feb. 7, 2013. The entirety of the above-mentioned patent application is hereby incorporated by reference herein and made a part of this specification.

BACKGROUND

1. Technology Field

The invention generally relates to a signal processing method. Particularly, the invention relates to a signal processing method of a connector, and a connector and a memory storage device using the same.

2. Related Art

Digital cameras, cell phones, and MP3 players have undergone rapid growth in recent years, so that consumer demands for storage media have also rapidly increased. Since a rewritable non-volatile memory module (for example, a flash memory) has characteristics of data non-volatility, low power consumption, small volume, and non-mechanical structure, etc., it is adapted to be built in the aforementioned various portable multimedia devices.

Generally, the rewritable non-volatile memory module is coupled to a host system through a connector. In some communication standards, a spread spectrum clock (SSC) operation is probably performed on a signal stream transmitted between the connector and the host system, i.e. a frequency of the signal stream is varied along with time within a certain range, such that energy of the signal is distributed to a frequency band range to suppress electromagnetic interference (EMI) of the signal. Although the SSC operation can mitigate the influence of noise or interference, it may use a larger bandwidth, and the frequency of the signal stream is probably varied along with time. However, in some applications, the connector does not have a crystal oscillator to generate an accurate clock signal, instead, the connector generates the clock signal by referring to the signal stream transmitted by the host system. Therefore, it is an important issued concerted by related technicians to design a connector capable of generating an accurate output signal complied with the standards without using the crystal oscillator.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The exemplary embodiments of the invention are directed to a signal processing method, a connector and a memory storage device, and the connector without a crystal oscillator is capable of generating an output signal complied with a specific standard.

An exemplary embodiment of the invention provides a signal processing method for a connector, where the connector does not include a crystal oscillator. The signal processing method includes following steps. A first signal stream is received from a host system. A transmission frequency of the first signal stream is tracked, and a frequency shift quantity of the first signal stream relative to the transmission frequency is obtained. It is determined whether a spread spectrum operation is performed on the first signal stream according to the frequency shift quantity to generate a determination result. A second signal stream is generated according to the determination result and the transmission frequency.

According to another aspect, an exemplary embodiment of the disclosure provides a connector. The connector does not include a crystal oscillator, and includes a reception circuit, a frequency tracking circuit and a transmission circuit. The reception circuit receives a first signal stream from a host system. The frequency tracking circuit is coupled to the reception circuit, and tracks a transmission frequency of the first signal stream. The transmission circuit is coupled to the reception circuit and the frequency tracking circuit. The reception circuit obtains a frequency shift quantity of the first signal stream relative to the transmission frequency, and determines whether a spread spectrum operation is performed on the first signal stream according to the frequency shift quantity to generate a determination result. The transmission circuit generates a second signal stream according to the determination result and the transmission frequency.

According to another aspect, an exemplary embodiment of the invention provides a memory storage device including a rewritable non-volatile memory module, a memory controller and a connector. The rewritable non-volatile memory module includes a plurality of physical erasing units. The memory controller is coupled to the rewritable non-volatile memory module. The connector is coupled to the memory controller, and is coupled to a host system. The connector does not include a crystal oscillator, and includes a reception circuit, a frequency tracking circuit and a transmission circuit. The reception circuit receives a first signal stream from the host system. The frequency tracking circuit is coupled to the reception circuit, and tracks a transmission frequency of the first signal stream. The transmission circuit is coupled to the reception circuit and the frequency tracking circuit. The reception circuit obtains a frequency shift quantity of the first signal stream relative to the transmission frequency, and determines whether a spread spectrum operation is performed on the first signal stream according to the frequency shift quantity to generate a determination result. The transmission circuit generates a second signal stream according to the determination result and the transmission frequency.

According to the above descriptions, the signal processing method, the connector and the memory storage device of the invention may detect whether the spread spectrum operation is performed on the signal stream come from the host system without using the crystal oscillator, and correspondingly performs the spread spectrum operation on the signal stream transmitted to the host system.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
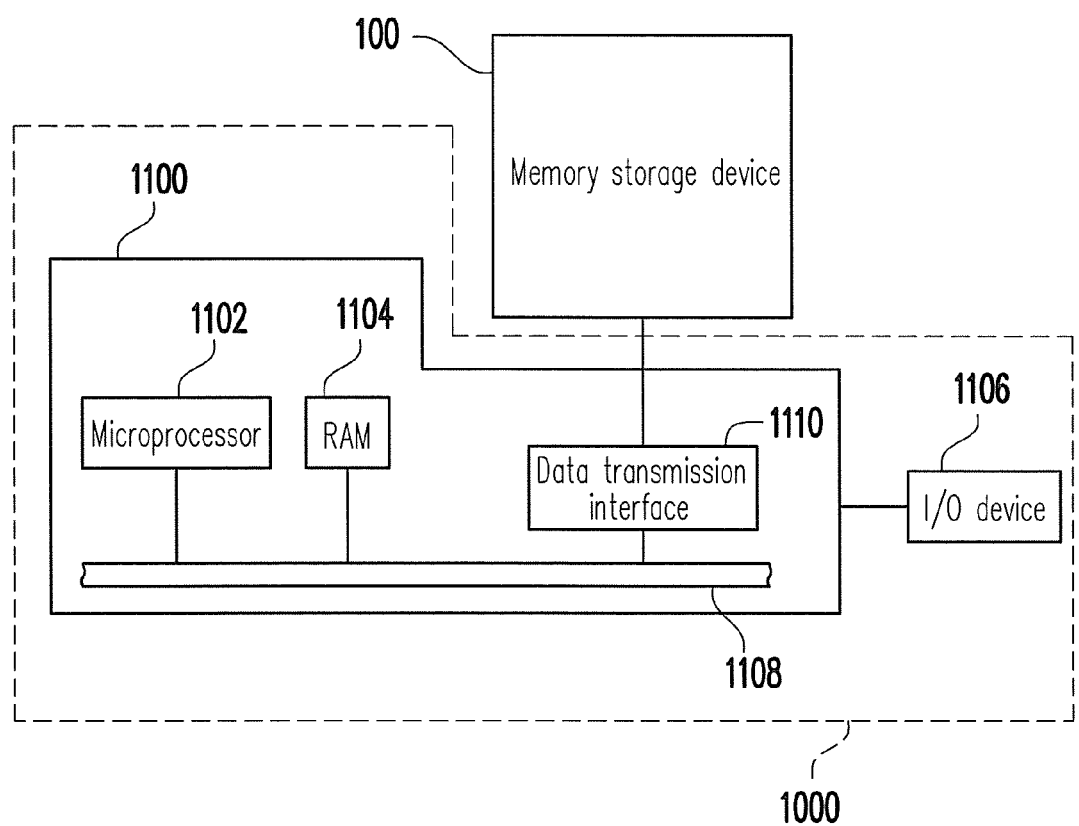
FIG. 1A is a schematic diagram of a host system and a memory storage device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (which is also referred to as a memory storage system) includes a rewritable non-volatile memory module and a controller (which is also referring to as a control circuit). The memory storage device is generally used together with a host system such that the host system can write data into the memory storage device or read data from the memory storage device.

FIG. 1A is a schematic diagram of a host system and a memory storage device according to an exemplary embodiment of the invention.

Figure 1B:
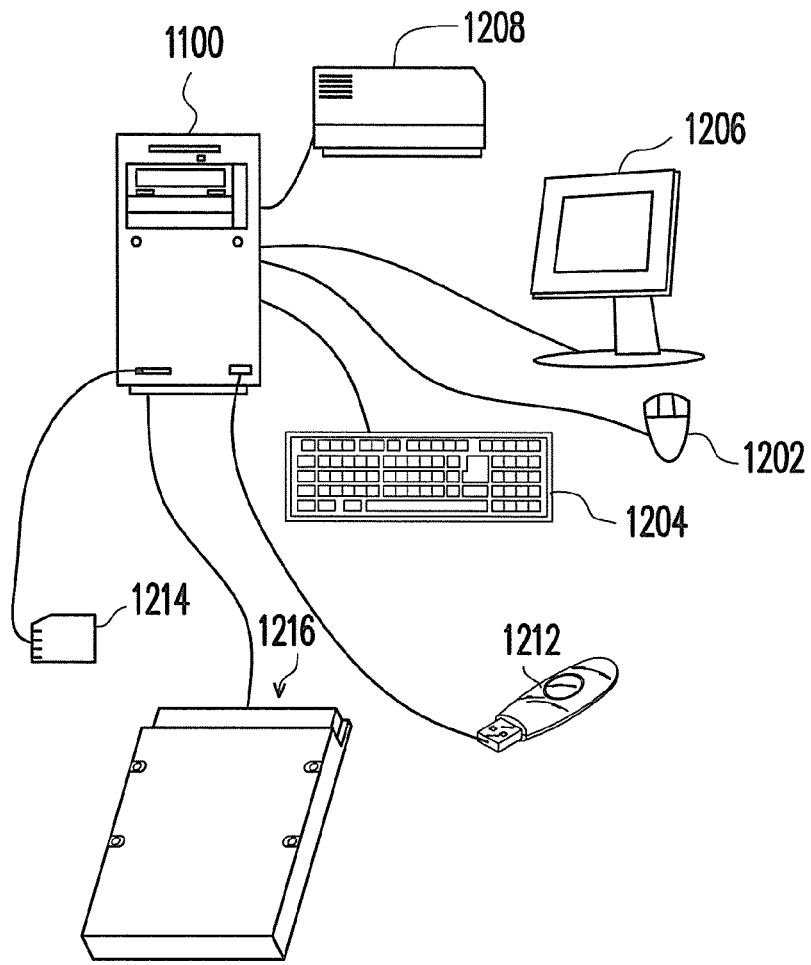
FIG. 1B is a schematic diagram of a computer, an input/output device and a memory storage device according to an exemplary embodiment of the invention.

Referring to FIG. 1A, the host system 1000 includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206 and a printer 1208 as that shown in FIG. 1B. It should be noticed that the devices shown in FIG. 1B are not used to limit the I/O device 1106, and the I/O device 1106 may include other devices.

In the present embodiment, the memory storage device 100 is coupled to the other components of the host system 1000 through the data transmission interface 1110. Based on operations of the microprocessor 1102, the RAM 1104 and the I/O device 1106, data can be written into the memory storage device 100 or read from the memory storage device 100. For example, the memory storage device 100 can be a rewritable non-volatile memory storage device such as a flash drive 1212, a memory card 1214 or a solid state drive (SSD) 1216, etc. as that shown in FIG. 1B.

Figure 1C:
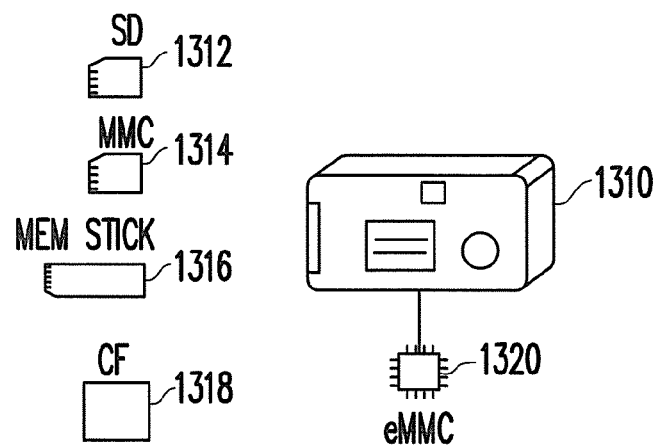
FIG. 1C is a schematic diagram of a host system and a memory storage device according to an exemplary embodiment of the invention.

Generally, the host system 1000 can be any system substantially collaborating with the memory storage device 100 to storage data. In the present exemplary embodiment, although the host system 1000 implemented as the computer system is taken as an example for descriptions, in another exemplary embodiment of the invention, the host system 1000 can by a digital camera, a video camera, a communication device, an audio player or a video player, etc. For example, if the host system is the digital camera (video camera) 1310, the rewritable non-volatile memory storage device is a secure digital (SD) card 1312, a multi media card (MMC) 1314, a memory stick 1316, a compact flash (CF) card 1318 or an embedded storage device 1320 (shown in FIG. 1C). The embedded storage device 1320 includes an embedded MMC (eMMC). It should be noticed that the eMMC is directly coupled to a substrate of the host system.

Figure 2:
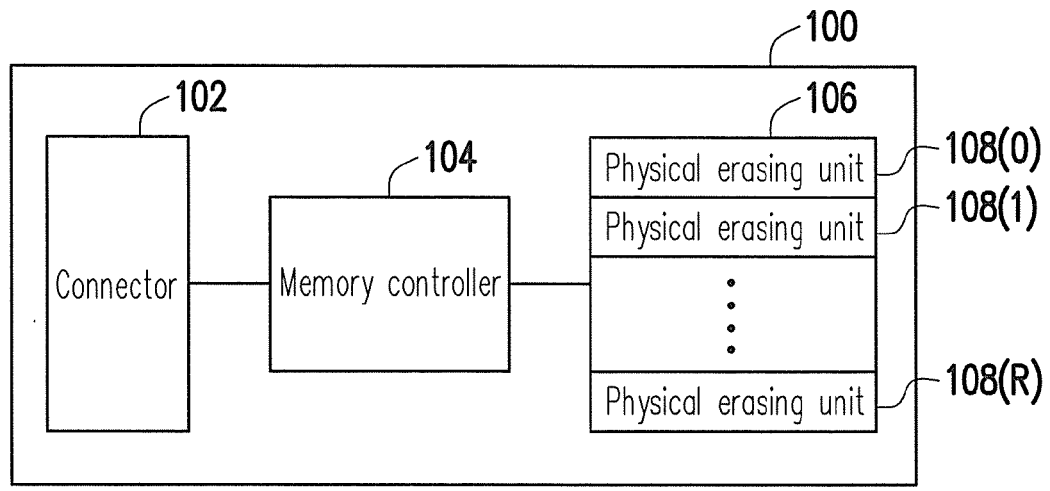
FIG. 2 is a schematic block diagram of the memory storage device of FIG. 1A.

FIG. 2 is a schematic block diagram of the memory storage device of FIG. 1A.

Referring to FIG. 2, the memory storage device 100 includes a connector 102, a memory controller 104 and a rewritable non-volatile memory module 106.

In the present exemplary embodiment, the connector 102 is complied with a universal serial bus (USB) standard. However, it should be noticed that the invention is not limited thereto, and the connector 102 can also be complied with a serial advanced technology attachment (SATA) standard, a parallel advanced technology attachment (PATA) standard, an institute of electrical and electronic engineers (IEEE) 1394 standard, a peripheral component interconnect express (PCI express) standard, a secure digital (SD) interface standard, an ultra high speed-I (UHS-I) interface standard, an ultra high speed-II (UHS-II) interface standard, a memory stick (MS) interface standard, a MMC interface standard, an eMMC interface standard, a universal flash storage (UFS) interface standard, a CF interface standard, an integrated device electronics (IDE) standard or other suitable standards.

The memory controller 104 may execute a plurality of logic gates or control instructions implemented in a hardware form or a firmware form, and may perform a write operation, a read operation or an erase operation to the rewritable non-volatile memory module 106 according to commands of the host system 1000.

The rewritable non-volatile memory module 106 is coupled to the memory controller 104 for storing data written by the host system 1000. The rewritable non-volatile memory module 106 has physical erasing units 108(0)-108(R). For example, the physical erasing units 108(0)-108(R) may belong to a same memory die or belong to different memory dies. Each of the physical erasing units has a plurality of physical programming units, and the physical programming units belonging to the same physical erasing unit can be independently written and simultaneously erased. For example, each of the physical erasing units is composed of 128 physical programming units. However, it should be noticed that the invention is not limited thereto, and each of the physical erasing units can be composed of 64 physical programming units, 256 physical programming units or any number of the physical programming units.

In detail, physical erasing unit is the smallest unit for erasing data. Namely, each physical erasing unit contains the least number of memory cells that are erased all together. Physical programming unit is the smallest unit for programming data. Namely, physical programming unit is the smallest unit for writing data. Each of the physical programming units usually includes a data bit area and a redundant bit area. The data bit area includes a plurality of physical accessing addresses for storing user data, and the redundant bit area is used for storing system data (for example, control information and error checking and correcting (ECC) codes). In the present exemplary embodiment, the data bit area of each of the physical programming units includes 4 physical accessing addresses, and a size of each physical accessing address is 512 bytes (B). However, in other exemplary embodiments, the data bit area may also include 8, 16 or more or less number of the physical accessing addresses, and the size and the number of the physical accessing addresses are not limited by the invention. For example, the physical erasing unit is a physical block, and the physical programming unit is a physical page or a physical sector.

In the present exemplary embodiment, the rewritable non-volatile memory module 106 is a multi level cell (MLC) NAND flash memory module, i.e. each memory cell may store at least 2 batches of bit data. However, the invention is not limited thereto, and the rewritable non-volatile memory module 106 can also be a single level cell (SLC) NAND flash memory module, a trinary level cell (TLC) NAND flash memory module, other flash memory modules or other memory modules have the same characteristics.

Figure 3:
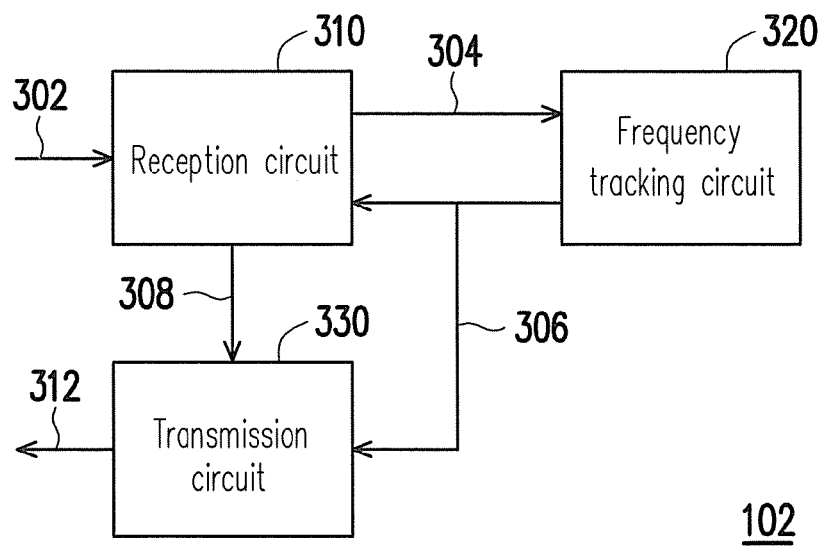
FIG. 3 is a block diagram of a connector according to an exemplary embodiment of the invention.

FIG. 3 is a block diagram of a connector according to an exemplary embodiment of the invention.

Referring to FIG. 3, the connector 102 at least includes a reception circuit 310, a frequency tracking circuit 320 and a transmission circuit 330. The reception circuit 310 receives a first signal stream 302 from the host system 1000, and detects a frequency of the first signal stream 302. The reception circuit 310 also transmits frequency information 304 related to the first signal stream 302 to the frequency tracking circuit 320. The frequency tracking circuit 320 tracks a transmission frequency of the first signal stream 302. For example, the transmission frequency is an average frequency of the first signal stream 302. The frequency tracking circuit 320 transmits a clock signal 306 complied with the transmission frequency to the reception circuit 310 and the transmission circuit 330. The reception circuit 310 obtains a frequency shift quantity of the first signal stream 302 relative to the transmission frequency. For example, the reception circuit 310 continuously receives the first signal stream 302, and calculates a difference between the frequency and the transmission frequency of the first signal stream 302 at a certain time point to generate the frequency shift quantity. The reception circuit 310 also determines whether a spread spectrum operation is performed on the first signal stream 302 according to the frequency shift quantity to generate a determination result 308. If the spread spectrum operation is performed on the first signal stream 302, it represents that the frequency of the first signal stream 302 is varied along with time. Therefore, the greater an absolute value of the frequency shift quantity is, the more likely the spread spectrum operation is performed on the first signal stream 302. The reception circuit 310 transmits the determination result 308 to the transmission circuit 330, and the transmission circuit 330 generates a second signal stream 312 according to the determination result 308 and the clock signal 306, and transmits the second signal stream 312 to the host system 1000 or another electronic device. Particularly, the connector 102 does not include a crystal oscillator.

Figure 4:
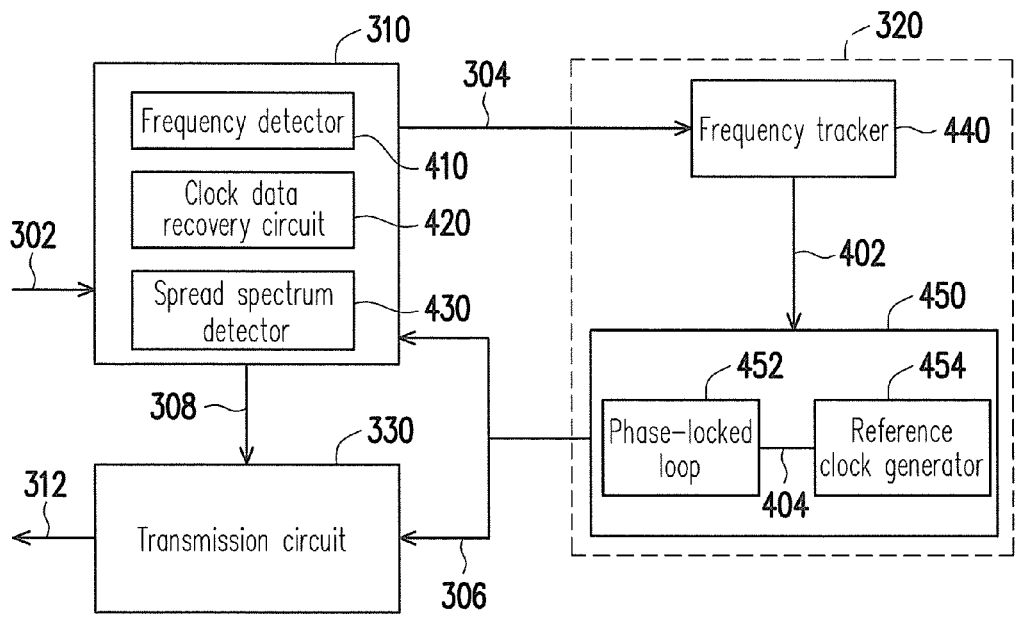
FIG. 4 is a block diagram of a connector 102 according to an exemplary embodiment of the invention.

FIG. 4 is a block diagram of the connector 102 according to an exemplary embodiment of the invention.

Referring to FIG. 4, in the exemplary embodiment of FIG. 4, the reception circuit 310 includes a frequency detector 410, a clock data recovery (CDR) circuit 420 and a spread spectrum detector 430. The frequency tracking circuit 320 includes a frequency tracker 440 and a clock generation circuit 450. The clock generation circuit 450 further includes a phase-locked loop 452 and a reference clock generator 454.

The CDR circuit 420 is used to recover data according to the first signal stream 302. The CDR circuit 420 also determines whether the first signal stream 302 is complied with the specification of a transmission standard. For example, in the specification of USB 3.0, a range of the spread spectrum operation is limited (for example, the minimum spread spectrum range is 0~−4000 ppm (parts per million), and the maximum spread spectrum range is 0~−5000 ppm). The CDR circuit 420 determines whether the frequency of the first signal stream 302 exceeds the aforementioned ranges.

The frequency detector 410 continuously detects the frequency of the first signal stream 302, and detects a difference between the frequency of the first signal stream 302 and the frequency of the clock signal 306. In the present exemplary embodiment, the difference is the frequency information 304, and the frequency detector 410 transmits the frequency information 304 to the frequency tracker 440.

Figure 5:
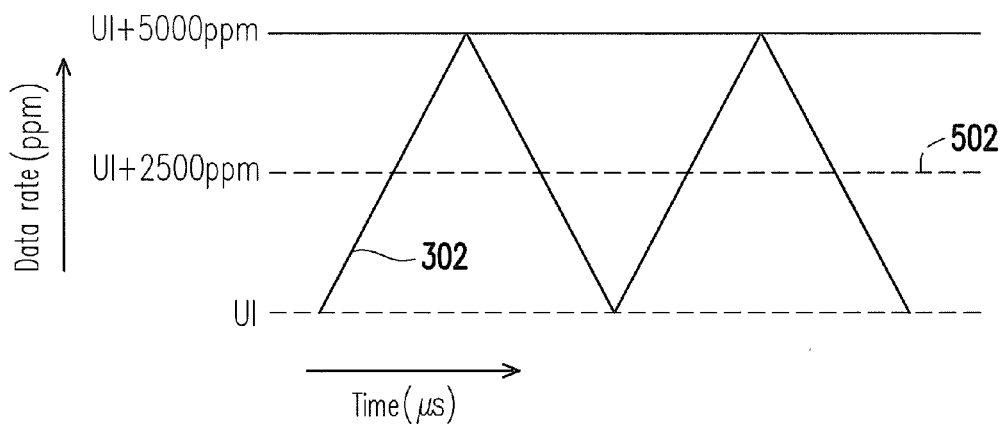
FIG. 5 is a schematic diagram of tracking a first signal stream according to an exemplary embodiment of the invention.

The frequency tracker 440 detects an average frequency of the first signal stream 302 according to the frequency information 304, and determines whether the average frequency is within a variation range during a first time interval. For example, the variation range is 300 ppm, and the first time interval can be any value, though the invention is not limited thereto. If the average frequency is within the variation range during the first time interval, the frequency tracker 440 sets the average frequency to be the transmission frequency of the first signal stream 302. Referring to FIG. 5, a horizontal axis represents time, and a unit thereof is microsecond (μs), and a vertical axis represents data rate, which is also referred to as frequency, and is represented by ppm. In the exemplary embodiment of FIG. 5, a spread spectrum operation is performed on the first signal stream 302, and the spread spectrum range thereof is 0~−5000 ppm. The frequency tracker 440 tracks a transmission frequency 502. In detail, a unit interval (UI) is a reciprocal of a standard frequency. For example, if the standard frequency of transmission between the host system 1000 and the memory storage device 100 is 5 GHz, the UI is 1/5 G second. Here, the range of the spread spectrum operation is 0~−5000 ppm, and the range of the UI is UI~UI+5000 ppm. Here, UI is used to represent a value of the frequency, so that the frequency corresponding to the UI is greater than the frequency corresponding to UI+5000 ppm, which is not repeated. In the exemplary embodiment of FIG. 5, the transmission frequency 502 is UI+2500 ppm.

Referring to FIG. 4, the frequency tracker 440 generates a control code 402 to the clock generation circuit 450. The reference clock generator 454 generates a reference clock 404 to the phase-locked loop 452. The clock generation circuit 450 can be a Hartley oscillator, a Colpitts oscillator, a Clapp oscillator, a phase-shift oscillator, a RC oscillator, a LC oscillator or other oscillators other than crystal oscillator.

The phase-locked loop 452 is used to correct the clock generated by the clock generation circuit 450 according to the control code 402, and corrects the clock into an accurate clock signal 306, where a frequency of the clock signal 306 is the transmission frequency. The operation of the phase-locked loop 452 is known by those skilled in the art, which is not described in detail.

Figure 6:
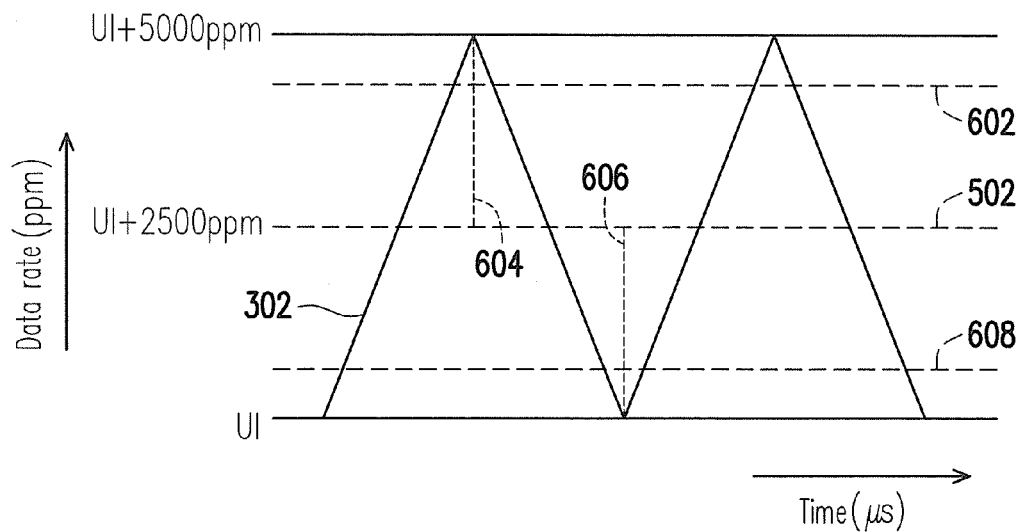
FIG. 6 and FIG. 7 are schematic diagrams of determining whether a spread spectrum operation is performed according to an exemplary embodiment of the invention.

The spread spectrum detector 430 determines whether the spread spectrum operation is performed on the first signal stream 302 according to the clock signal 306. In an exemplary embodiment, the spread spectrum detector 430 calculates a difference between the frequency and the transmission frequency of the first signal stream 302 at a certain time point to serve as the frequency shift quantity. The spread spectrum detector 430 determines whether the frequency shift quantity is complied with a first threshold. If the frequency shift quantity is complied with the first threshold, the spread spectrum detector 430 determines that the spread spectrum operation is performed on the first signal stream 302. For example, as shown in FIG. 6, the first threshold is a difference (a positive number) between a frequency 602 and the transmission frequency 502, and the frequency shift quantity 604 is greater than the first threshold. Therefore, the spread spectrum detector 430 determines that the spread spectrum operation is performed on the first signal stream 302. It should be noticed that in an actual application, the spread spectrum detector 430 may first subtract the first threshold from the transmission frequency 502 to obtain the frequency 602, and determines whether the frequency of the first signal stream 302 is lower than the frequency 602, so as to determine whether the spread spectrum operation is performed on the first signal stream 302. On the other hand, after it is determined that the frequency shift quantity 606 is greater than the first threshold, the spread spectrum detector 430 also determines that the spread spectrum operation is performed on the first signal stream 302. Similarly, in an actual application, the spread spectrum detector 430 can first add the transmission frequency 502 by the first threshold to obtain a frequency 608, and determines whether the frequency of the first signal stream 302 is greater than the frequency 608, so as to determine whether the spread spectrum operation is performed on the first signal stream 302. Here, the method of "determining whether the frequency shift quantity is complied with the first threshold" includes the aforementioned various implementations, which is not limited by the invention. Moreover, the value of the first threshold is not limited by the invention.

In another exemplary embodiment, the spread spectrum detector 430 first detects the maximum frequency (which is UI) or the minimum frequency (which is UI+5000 ppm) of the first signal stream 302, and then determines whether a difference between the maximum frequency and the transmission frequency 502 is greater than the first threshold, or whether a difference between the minimum frequency and the transmission frequency 502 is smaller than the negative first threshold. Similarly, in an actual application, the spread spectrum detector 430 may also determine whether the maximum frequency is greater than the frequency 608, or whether the minimum frequency is smaller than the frequency 602, so as to determine whether the spread spectrum operation is performed on the first signal stream 302.

Figure 7:
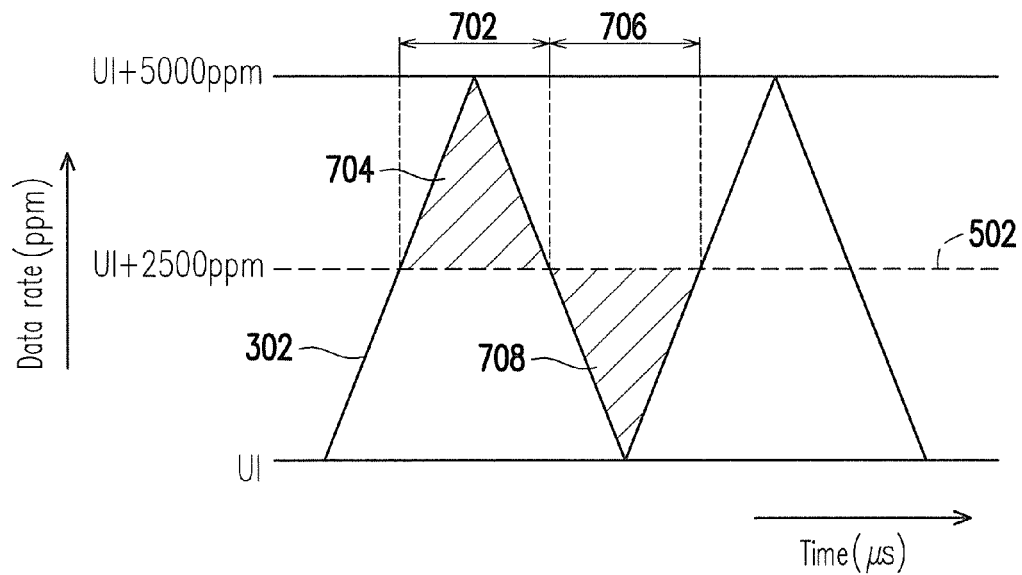

FIG. 7 is a schematic diagram of determining whether a spread spectrum operation is performed according to an exemplary embodiment of the invention.

Referring to FIG. 7, in the exemplary embodiment of FIG. 7, the spread spectrum detector 430 accumulates the frequency shift quantity within a second time interval to generate an accumulated frequency difference. The spread spectrum detector 430 determines whether the accumulated frequency difference is complied with a second threshold. If the accumulated frequency difference is complied with the second threshold, the spread spectrum detector 430 determines that the spread spectrum operation is performed on the first signal stream 302. For example, the spread spectrum detector 430 accumulates the frequency shift quantity within a time interval 702, and the calculated accumulated frequency difference can be represented by an area of a region 704. If the area of the region 704 is greater than the second threshold, the spread spectrum detector 430 determines that the spread spectrum operation is performed on the first signal stream 302. Alternatively, the spread spectrum detector 430 may also accumulate the frequency shift quantity within the time interval 706, and the calculated accumulated frequency difference can be represented by an area of a region 708. However, the range of the second time interval and the value of the second threshold are not limited by the invention.

Referring to FIG. 4, after the spread spectrum detector 430 determines whether the spread spectrum operation is performed on the first signal stream 302, it transmits the determination result 308 to the transmission circuit 330. Moreover, the clock generation circuit 450 which uses the first signal stream 302 to correct the reference clock learns whether the tracked transmission frequency corresponds to UI or UI+2500 ppm. In this way, the transmission circuit 330 knows how to generate the second signal stream 312 according to the tracked transmission frequency. It should be noticed that in another exemplary embodiment, the spread spectrum operation is not necessarily performed on the second signal stream 312. The transmission circuit 330 may determine whether to perform the spread spectrum operation on the second signal stream 312 according to a control signal which is determined according to a transmission destination or a function of the second signal stream 312 or according to an interface of the host system 1000. In other words, the transmission circuit 330 further determines whether the spread spectrum operation is to be performed on the transmitted second signal stream 312, so as to generate the second signal stream 312 under different circumstances.

In detail, the transmission circuit 330 is to convert a data signal stream into the second signal stream 312, and transmits the second signal stream 312 to the host system 1000. If the spread spectrum operation is not performed on the first signal stream 302, and the spread spectrum operation is not to be performed on the second signal stream 312, the transmission circuit 330 takes the data signal stream complied with the transmission frequency as the second signal stream 312 according to the clock signal 306. If the spread spectrum operation is not performed on the first signal stream 302, and the spread spectrum operation is to be performed on the second signal stream 312, the transmission circuit 330 performs the spread spectrum operation on the data signal stream complied with the transmission frequency according to an adjusting signal to generate the second signal stream 312.

Figure 8A:
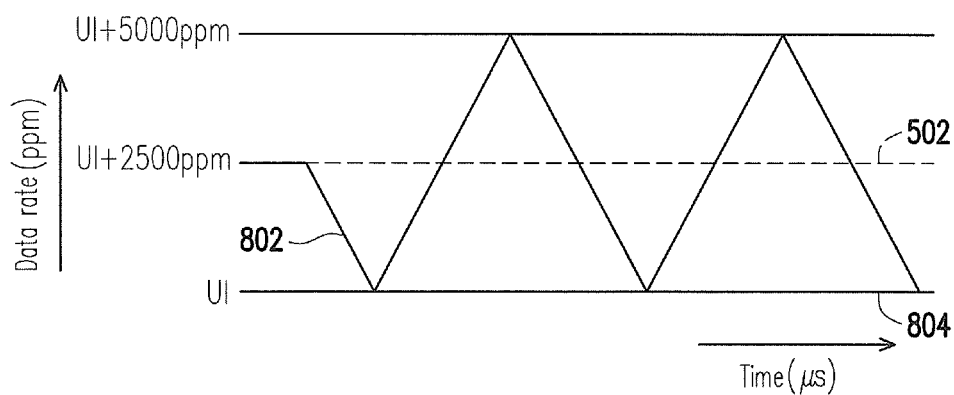
FIG. 8A and FIG. 8B are schematic diagrams of generating a second signal stream according to an exemplary embodiment of the invention.
Figure 8B:
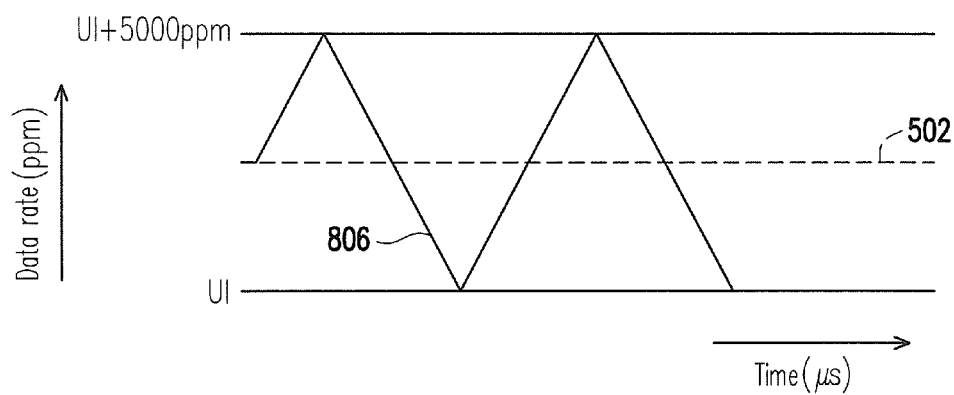

FIG. 8A and FIG. 8B are schematic diagrams of generating a second signal stream according to an exemplary embodiment of the invention.

Referring to FIG. 8A, if the spread spectrum operation is performed on the first signal stream 302, and the spread spectrum operation is to be performed on the second signal stream 312, the transmission circuit 330 converts a data signal stream 802 from the transmission frequency 502 to a compensation frequency 804. The transmission circuit 330 performs a downward spread spectrum operation on the data signal stream 802 complied with the compensation frequency 804 according to an adjusting signal to generate the second signal stream 312. Here, the compensation frequency 804 is greater than the transmission frequency 502, and a range of the downward spread spectrum operation is 0~−5000 ppm (corresponding to UI~UI+5000 ppm). However, in other exemplary embodiments, the downward spread spectrum operation may have other ranges, which is not limited by the invention.

If the spread spectrum operation is performed on the first signal stream 302, though the spread spectrum operation is not to be performed on the second signal stream 312, after the transmission circuit 330 converts the transmission frequency 502 to the compensation frequency 804, the transmission circuit 330 takes the data signal stream 802 complied with the compensating frequency 804 as the second signal stream 312.

Referring to FIG. 8B, in another exemplary embodiment, if the spread spectrum operation is performed on the first signal stream 302, and the spread spectrum operation is to be performed on the second signal stream 312, the transmission circuit 330 performs a center spread spectrum operation on the data signal stream 806 complied with the transmission frequency 502 according to an adjusting signal to generate the second signal stream. In the present exemplary embodiment, the range of the center spread spectrum operation is −2500 ppm~2500 ppm, though the invention is not limited thereto. In this way, even if the connector 102 does not have a crystal oscillator, the connector 102 can generate the second signal stream 312 with or without the spread spectrum operation performed thereon according to the transmission frequency 502.

Figure 9:
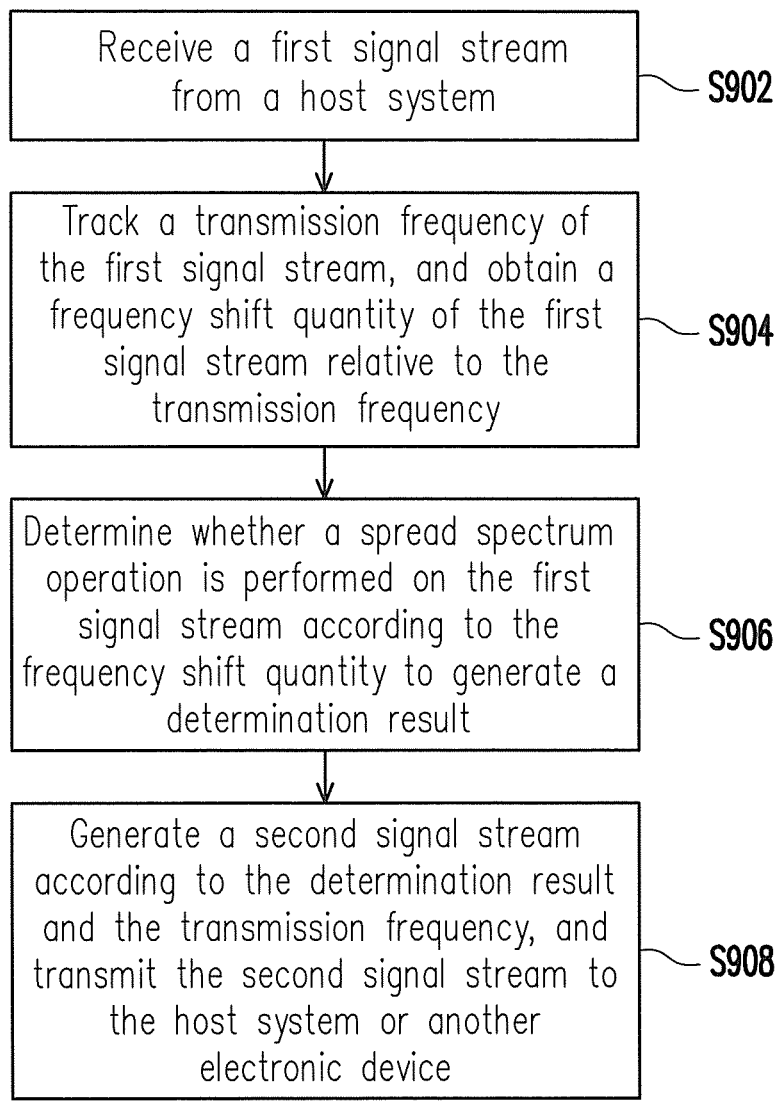
FIG. 9 is a flowchart illustrating a signal processing method according to an exemplary embodiment of the invention.

FIG. 9 is a flowchart illustrating a signal processing method according to an exemplary embodiment of the invention.

Referring to FIG. 9, in step S902, a first signal stream is received from a host system. In step S904, a transmission frequency of the first signal stream is tracked, and a frequency shift quantity of the first signal stream relative to the transmission frequency is obtained. In step S906, it is determined whether a spread spectrum operation is performed on the first signal stream according to the frequency shift quantity to generate a determination result. In step S908, a second signal stream is generated according to the determination result and the transmission frequency, and the second signal stream is transmitted to the host system or another electronic device. The steps of FIG. 9 have been described in detail above, and are not repeated. It should be noticed that the steps of FIG. 9 can be implemented by a plurality of program codes or circuits, which is not limited by the invention. Moreover, the method of FIG. 9 can be used in collaboration with the aforementioned exemplary embodiments or can be independently used, which is not limited by the invention.

In summary, the signal processing method, the connector and the memory storage device of the invention may detect whether the spread spectrum operation is performed on the signal stream come from the host system without using the crystal oscillator. Moreover, according to the determination result and the tracked transmission frequency, the signal stream transmitted to the host system is complied with a transmission standard.

The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A signal processing method for a connector, wherein the connector does not comprise a crystal oscillator, the signal processing method comprising:
   receiving a first signal stream from a host system;
   tracking a transmission frequency of the first signal stream, and obtaining a frequency shift quantity of the first signal stream relative to the transmission frequency;
   determining whether a spread spectrum operation is performed on the first signal stream according to the frequency shift quantity to generate a determination result; and
   generating a second signal stream according to the determination result and the transmission frequency,
   wherein the step of tracking the transmission frequency of the first signal stream comprises:
   detecting an average frequency of the first signal stream, determining whether the average frequency is within a variation range during a first time interval; and
   setting the average frequency to be the transmission frequency if the average frequency is within the variation range during the first time interval.

2. The signal processing method as claimed in claim 1, wherein the step of determining whether the spread spectrum operation is performed on the first signal stream according to the frequency shift quantity comprises:
   determining whether the frequency shift quantity is complied with a first threshold; and
   determining that the spread spectrum operation is performed on the first signal stream if the frequency shift quantity is complied with the first threshold.

3. The signal processing method as claimed in claim 2, wherein the frequency shift quantity is a difference between a maximum frequency of the first signal stream and the transmission frequency, or a difference between a minimum frequency of the first signal stream and the transmission frequency.

4. The signal processing method as claimed in claim 1, wherein the step of determining whether the spread spectrum operation is performed on the first signal stream according to the frequency shift quantity comprises:
   accumulating the frequency shift quantity during a second time interval to generate an accumulated frequency difference;
   determining whether the accumulated frequency difference is complied with a second threshold; and
   determining that the spread spectrum operation is performed on the first signal stream if the accumulated frequency difference is complied with the second threshold.

5. The signal processing method as claimed in claim 1, wherein the step of generating the second signal stream according to the determination result and the transmission frequency comprises:
   performing a center spread spectrum operation on a data signal stream complied with the transmission frequency according to an adjusting signal to generate the second signal stream if the spread spectrum operation is performed on the first signal stream.

6. The signal processing method as claimed in claim 1, wherein the step of generating the second signal stream according to the determination result and the transmission frequency comprises:

converting a data signal stream from the transmission frequency to a compensation frequency if the spread spectrum operation is performed on the first signal stream, wherein the compensation frequency is greater than the transmission frequency; and performing a downward spread spectrum operation on the data signal stream complied with the compensation frequency according to an adjusting signal to generate the second signal stream.

7. A connector, not comprising a crystal oscillator, the connector comprising:

a reception circuit, configured to receive a first signal stream from a host system;

a frequency tracking circuit, coupled to the reception circuit and configured to track a transmission frequency of the first signal stream; and a transmission circuit, coupled to the reception circuit and the frequency tracking circuit, wherein the reception circuit is configured to obtain a frequency shift quantity of the first signal stream relative to the transmission frequency, and determine whether a spread spectrum operation is performed on the first signal stream according to the frequency shift quantity to generate a determination result, wherein the transmission circuit is configured to generate a second signal stream according to the determination result and the transmission frequency, wherein the operation that the frequency tracking circuit tracks the transmission frequency of the first signal stream comprises:

the frequency tracking circuit detects an average frequency of the first signal stream, and determines whether the average frequency is within a variation range during a first time interval; and the frequency tracking circuit sets the average frequency to be the transmission frequency if the average frequency is within the variation range during the first time interval.

8. The connector as claimed in claim 7, wherein the reception circuit comprises a spread spectrum detector, and the operation that the reception circuit determines whether the spread spectrum operation is performed on the first signal stream according to the frequency shift quantity comprises:

the spread spectrum detector determines whether the frequency shift quantity is complied with a first threshold; and the spread spectrum detector determines that the spread spectrum operation is performed on the first signal stream if the frequency shift quantity is complied with the first threshold.

9. The connector as claimed in claim 8, wherein the frequency shift quantity is a difference between a maximum frequency of the first signal stream and the transmission frequency, or a difference between a minimum frequency of the first signal stream and the transmission frequency.

10. The connector as claimed in claim 7, wherein the reception circuit comprises a spread spectrum detector, and the operation that the reception circuit determines whether the spread spectrum operation is perfonned on the first signal stream according to the frequency shift quantity comprises:

the spread spectrum detector accumulates the frequency shift quantity during a second time interval to generate an accumulated frequency difference;

the spread spectrum detector determines whether the accumulated frequency difference is complied with a second threshold; and the spread spectrum detector determines that the spread spectrum operation is performed on the first signal stream if the accumulated frequency difference is complied with the second threshold.

11. The connector as claimed in claim 7, wherein the operation that the transmission circuit generates the second signal stream according to the determination result and the transmission frequency comprises:

the transmission circuit performs a center spread spectrum operation on a data signal stream complied with the transmission frequency according to an adjusting signal to generate the second signal stream if the spread spectrum operation is performed on the first signal stream.

12. The connector as claimed in claim 7, wherein the operation that the transmission circuit generates the second signal stream according to the determination result and the transmission frequency comprises:

the transmission circuit converts a data signal stream from the transmission frequency to a compensation frequency if the spread spectrum operation is performed on the first signal stream, wherein the compensation frequency is greater than the transmission frequency; and the transmission circuit performs a downward spread spectrum operation on the data signal stream complied with the compensation frequency according to an adjusting signal to generate the second signal stream.

13. A memory storage device, comprising:

a rewritable non-volatile non-transitory memory module, comprising a plurality of physical erasing units;

a memory controller, coupled to the rewritable non-volatile memory module; and a connector, coupled to the memory controller, configured to couple to a host system, wherein the connector does not comprise a crystal oscillator, and comprises:

a reception circuit, configured to receive a first signal stream from the host system;

a frequency tracking circuit, coupled to the reception circuit, configured to track a transmission frequency of the first signal stream; and a transmission circuit, coupled to the reception circuit and the frequency tracking circuit, wherein the reception circuit is configured to obtain a frequency shift quantity of the first signal stream relative to the transmission frequency, and determine whether a spread spectrum operation is performed on the first signal stream according to the frequency shift quantity to generate a determination result, wherein the transmission circuit is configured to generate a second signal stream according to the determination result and the transmission frequency, wherein the operation that the frequency tracking circuit tracks the transmission frequency of the first signal stream comprises:

the frequency tracking circuit detects an average frequency of the first signal stream, and determines whether the average frequency is within a variation range during a first time interval; and the frequency tracking circuit sets the average frequency to be the transmission frequency if the average frequency is within the variation range during the first time interval.

14. The memory storage device as claimed in claim 13, wherein the reception circuit comprises a spread spectrum detector, and the operation that the reception circuit determines whether the spread spectrum operation is performed on the first signal stream according to the frequency shift quantity comprises:

the spread spectrum detector determines whether the frequency shift quantity is complied with a first threshold; and the spread spectrum detector determines that the spread spectrum operation is performed on the first signal stream if the frequency shift quantity is complied with the first threshold.

15. The memory storage device as claimed in claim 14, wherein the frequency shift quantity is a difference between a maximum frequency of the first signal stream and the transmission frequency, or a difference between a minimum frequency of the first signal stream and the transmission frequency.

16. The memory storage device as claimed in claim 13, wherein the reception circuit comprises a spread spectrum detector, and the operation that the reception circuit determines whether the spread spectrum operation is performed on the first signal stream according to the frequency shift quantity comprises:

the spread spectrum detector accumulates the frequency shift quantity during a second time interval to generate an accumulated frequency difference;

the spread spectrum detector determines whether the accumulated frequency difference is complied with a second threshold; and the spread spectrum detector determines that the spread spectrum operation is performed on the first signal stream if the accumulated frequency difference is complied with the second threshold.

17. The memory storage device as claimed in claim 13, wherein the operation that the transmission circuit generates the second signal stream according to the determination result and the transmission frequency comprises:

the transmission circuit performs a center spread spectrum operation on a data signal stream complied with the transmission frequency according to an adjusting signal to generate the second signal stream if the spread spectrum operation is performed on the first signal stream.

18. The memory storage device as claimed in claim 13, wherein the operation that the transmission circuit generates the second signal stream according to the determination result and the transmission frequency comprises:

the transmission circuit converts a data signal stream from the transmission frequency to a compensation frequency if the spread spectrum operation is performed on the first signal stream, wherein the compensation frequency is greater than the transmission frequency; and the transmission circuit performs a downward spread spectrum operation on the data signal stream complied with the compensation frequency according to an adjusting signal to generate the second signal stream.

\* \* \* \* \*